(12) United States Patent
Leicht et al.

(10) Patent No.: US 9,137,678 B2
(45) Date of Patent: Sep. 15, 2015

(54) LOCATION BASED NOTIFICATIONS

(75) Inventors: Amanda Leicht, San Francisco, CA (US); Alireza Ali, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 13/224,614

(22) Filed: Sep. 2, 2011

(65) Prior Publication Data

US 2015/0038170 A1 Feb. 5, 2015

(51) Int. Cl.
*H04W 24/00* (2009.01)

(52) U.S. Cl.
CPC .................... *H04W 24/00* (2013.01)

(58) Field of Classification Search
CPC ....... H04W 4/04; H04W 48/04; H04W 40/20; H04W 4/02
USPC ........................ 455/456.3; 370/338
See application file for complete search history.

(56) References Cited

U.S. PATENT DOCUMENTS

| 2002/0065693 A1* | 5/2002 | Hattori et al. ...................... 705/7 |
| 2004/0192311 A1* | 9/2004 | Koskinen et al. ............. 455/440 |
| 2005/0255861 A1* | 11/2005 | Wilson et al. ............. 455/456.2 |
| 2009/0005077 A1* | 1/2009 | Forstall et al. ............. 455/456.2 |
| 2009/0170507 A1* | 7/2009 | Kim ............................. 455/433 |

* cited by examiner

*Primary Examiner* — Marcos Batista
(74) *Attorney, Agent, or Firm* — Dority & Manning, P.A.

(57) ABSTRACT

Methods, systems, and apparatus, including computer programs encoded on a computer storage medium, for annotating search results. In one aspect, a method includes receiving a notification request, the notification request for identifying when to send a notification from the server system to a device, the notification request includes a device identifier, message text, and a location identifier. The method also includes receiving information corresponding to a current location of the device and information corresponding to an identity of the device. The method also includes determining that the information corresponding to the current location corresponds to the location identifier of the device from the notification request and that the information corresponding to the identity of the device corresponds to the device identifier from the notification request. The method also includes sending the notification, including the message text, to the device.

21 Claims, 6 Drawing Sheets

LOCATION BASED NOTIFICATIONS

TECHNICAL FIELD

This document generally describes location based notifications for mobile devices.

BACKGROUND

Individuals carry reminders and lists to remind them of tasks that need to be completed. These reminders can be location dependent. For example, a user may carry a grocery list to a grocery store. Parents may bring a wish list to a toy store for holiday and birthday shopping. Individuals use a variety of reminder methods to remind them to perform specific tasks. For example, an individual may tie a string around his finger to help him remember to pick up the dry cleaning or to purchase an anniversary gift.

Cellular telephones and other mobile devices have the ability to send and receive messages over a radio network. These messages can include Short Messaging Service (SMS) messages, e-mail messages, and push notifications.

SUMMARY

This document describes techniques for providing location-based notifications.

In general, one innovative aspect of the subject matter described in this specification can be embodied in methods that include the actions of receiving a notification request, the notification request for identifying when to send a notification from the server system to a device that is a subject of the notification request, the notification request comprising elements, the elements comprising a device identifier, message text, and a location identifier, the device identifier being unique to the device, the message text comprising content for the notification, and the location identifier comprising information for use in determining data relating to a geographic location of the device. The methods also include the actions of receiving information corresponding to a current location of the device and information corresponding to an identity of the device. The methods also include the actions of determining that the information corresponding to the current location corresponds to the location identifier of the device from the notification request and that the information corresponding to the identity of the device corresponds to the device identifier from the notification request. The methods also include the actions of sending the notification, including the message text, to the device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination the methods may include the actions of determining that a current time corresponds to a temporal limitation wherein the notification request further includes the temporal limitations. Determining that the information corresponding to the current location corresponds to the location identifier may include identifying locations corresponding to the location identifier and determining a distance between at least one of the identified locations is less than a threshold. The location identifier may identify a retain chain and identifying locations corresponding to the location identifier may include identifying at least one location of a retail outlet of the retail chain. The device identifier may be a telephone number associated with the device. The device identifier may be a serial number of a subscriber identity module. The method may include the actions of determining a set of notifications, each notification comprising a location identifier corresponding to the current location and a device identifier corresponding to the information corresponding to the identity of the device and sending the set of notifications to the device. Determining a set of notifications may include determining that the location identifier for a candidate notification is within a predetermined distance of the current location.

The details of one or more embodiments are set forth in the accompanying drawings and the description below. Other features, objects, and advantages of the invention will be apparent from the description and drawings, and from the claims.

DETAILED DESCRIPTION

Users frequently have a need to receive reminders and messages based not on a location, but instead based on the location of the user. For example, a user may wish to be reminded to pick up his dry cleaning, or may wish to be sent a grocery list when he is near the grocery store. The user requests a computer system send a notification (for example, a grocery list) to a mobile device when the mobile device is at or near the location. Later, when the mobile device approaches the location, the computer system sends to the notification (e.g., grocery list).

Figure 1:
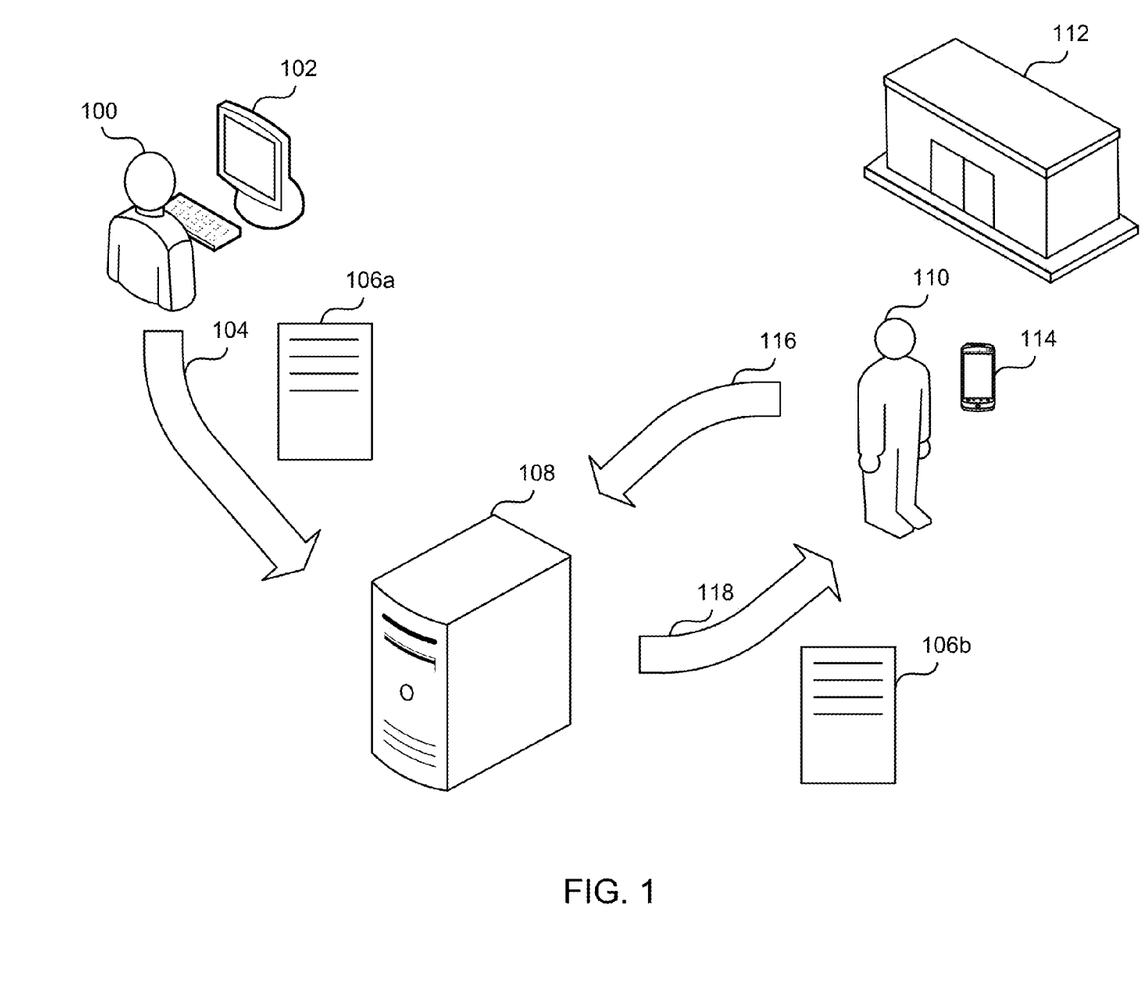
FIG. 1 is a conceptual diagram of a system for providing location-based notifications.

FIG. 1 is an example of an environment for providing location-based notifications. In general, a location based notification is a message sent to a mobile device when the mobile device is at a specified location. The identification and use of the location of the mobile device can be subject to user approval. The user can be provided with the opportunity to "opt-in" after notice of how the location data is to be used, with appropriate measures taken to protect the user's privacy.

A user 100 creates a notification description 106a on a user device 102. The user device 102 can be, for example, a personal computer, a tablet, a smart phone, or other similar device. In this example, the notification description 106a includes a message, a location identifier, and a device identifier. In some implementations, the notification description can include other delivery criteria, for example, a date for delivery, a time range for delivery, or other criteria. The message can be any kind of data transferable over a network, such as text, images, films, voice, or other kinds of data. The location identifier can identify a single geographic location to which the notification should be sent, such as GPS coordinates a street address, etc. The location identifier can also describe multiple geographic locations. The notification can be sent to the mobile device when the mobile device is located at any of the multiple geographical locations. For example, the location identifier may describe a chain of grocery stores "Healthy Foods, Inc." The location identifier identifies any of the multiple geographic locations where the grocery stores are located. The device identifier indicates a mobile device to which the message should be delivered, for example, using a telephone number.

The message is delivered to the mobile device 114 when the mobile device 114 is at one of the locations indicated by the location identifier. In some implementations, the notification description 106a can also include a time, date, or range of time during which the notification message can be sent. For example, the notification description 106a may indicate that the message should be sent only during business hours.

In this example, the notification description 106a indicates that the computer system should send a shopping list to a mobile device 114 when the mobile device 114 is near a grocery store 112.

The user 100 sends 104 the notification description 106a to a computer system 108. The computer system can be, for example, a single computer or one or more computers. The computer system 108 stores the information in the notification description 106a.

A mobile device 114 of a user 110 sends 116 current location information to the computer system 108. The user 110 can be the same user 100 that submitted the notification description 106a or another user. The current location information identifies the location of the mobile device 114. The current location information can include, for example, GPS coordinates.

In some implementations, the mobile device 114 communicates a current location to the computer system 108 periodically, for example, once per hour, every 30 minutes, etc. The computer system 108 identifies the notifications for the mobile device within an area around the current location (for example, within 10 miles, within 20 miles, within 5 miles, etc.). The computer system 108 sends the identified notifications to mobile device 114. The identified notifications include locations corresponding to each notification. For example, each identified notification can include GPS coordinates associated with the notification. The mobile device 114 stores the notifications in memory.

The computer system 108 compares the current location of the mobile device 114 to the notification description 106a stored on the computer system 108 or in the memory of the mobile device 114. If the computer system 108 determines that, for a notification description, the mobile device 114 is a device indicated by a device identifier and that the current location of the mobile device corresponds to a location indicated by the location identifier, then the computer system sends 118 a notification 106b, including the message, to the mobile device 114.

In some implementations, the computer system 108 can send a group of notification descriptions to the mobile device, the group of notification descriptions each associated with a location within a predetermined proximity of the mobile device, as discussed below.

In the above example, the mobile device 114 sends location information that indicates that the mobile device is at the grocery store 112 and the computer system sends the grocery list to the mobile device 114.

Figure 2:
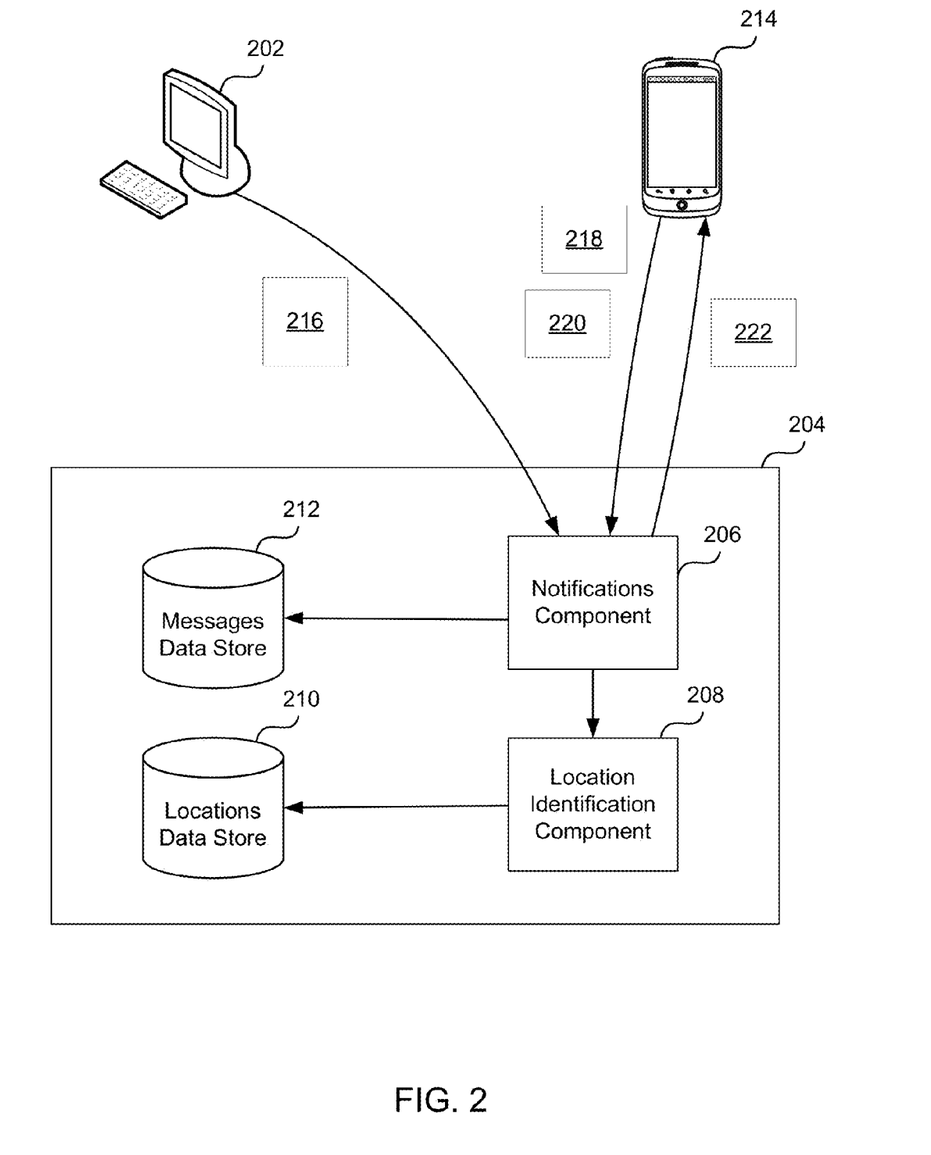
FIG. 2 illustrates an example of an environment for storing and sending location-based notifications.

FIG. 2 illustrates an example of an environment for storing and sending location-based notifications. A computer 202 presents a user interface to a user (not shown). The user interface enabled the user to create location based notifications. The computer 202 sends notification descriptions 216 to a computer system 204. The computer system 204 can be, for example, the computer system 108 of FIG. 1.

A notifications component 206 of the computer system 204 receives the notification description. In some implementations, the notifications component 206 may interact with a locations identification component 208 to identify locations indicated by a location indicated by the notification description 216. For example, the notification description 216 may identify a retail chain (e.g. "Grocery Chain, Inc.", "Mega Market", etc. . . . ), and the location identification component 208 can be used to identify one or more locations associated with the retail chain. In some implementations, the location identification component 208 can identify locations based on category (e.g. "grocery store", "park", "hardware store", etc. . . . ).

In some implementations, the location identification component 208 interacts with a location data store 210 to identify locations. The location data store 210 can include the locations of points of interest, for example, businesses, parks, landmarks, etc. identified by name, category, and location. In some implementations, points of interest can be grouped, for example, by retail chain.

The notification component 206 can store the notification description 216 and the identified locations in a message data store 212. In some implementations, the notification component 206 stores the locations identified by the location identification component 208.

A mobile device 214 provides identification information 218 and current location information 220 to the notification component 206. The identification information 218 and the current location information 220 can be sent as part of a single message or as multiple messages. The current location information 220 can include, for example, GPS coordinates. In some implementations, the notification component 206 interacts with a location identification component 208 to identify the location of the mobile device. For example, the location of the mobile device may be determined based on the cellular tower which receives radio communication, an Internet Protocol (IP) Address associated with a "hotspot", or through other methods.

The identification information 218 can be, for example, a telephone number, a serial number associated with a subscriber identity module (SIM) or other identification information associated with the mobile device.

The notification component 206 obtains stored notification descriptions associated with the mobile device 214 from the message data store 212. In some implementations, the notification component 206 compares the current location information 220 of the mobile device to the identified locations stored in the message data store 212. In other implementations, the notification component 206 obtains a location identifier from the notification description, and uses the location identifier to identify locations corresponding to the current location information. For example, the location identifier may describe a category of location, (e.g. "grocery store")

and the notification component 208 may use the location identification component 208 to determine if the current location of the mobile device 214 is near any location which matches the category. The notification component 206 can also compare other criteria which may be stored in the message data store 212, for example, a target date and/or target time for delivery.

The notification component delivers the message 222 associated with the notification description to the mobile device 214. The message 222 can be sent using push notifications, SMS messages, e-mail messages, or using any other appropriate communication method. In some implementations, the notification component 206 can place a telephone call to the mobile device 214 and play a recorded message.

In some implementations, notification information can be stored on the mobile device 214. The notification component 206 can send a group of notifications that identify the mobile device 214 to the mobile device 214. A client notification component (not shown) can execute on the mobile device, providing the notifications when the mobile device is in the vicinity of the locations. In this manner, notifications can be delivered even when cellular reception is not available.

In some implementations, the mobile device 214 communicates a current location to the notification component 206 periodically, for example, once per hour, every 30 minutes, etc. The notification component 206 identifies the notifications for the mobile device within an area around the current location (for example, within 10 miles, within 20 miles, within 5 miles, etc.). The notification component 206 sends the identified notifications to mobile device 214. The identified notifications include locations corresponding to each notification. For example, each identified notification can include GPS coordinates associated with the notification. The mobile device 214 stores the notifications in memory.

The mobile device 214 compares an updated current location against the send notifications more frequently (for example, every 30 seconds, every minute, continually). If the mobile device identifies a notification that corresponds to the updated current location, the mobile device presents the message associated with that notification to the user.

In some implementations, the mobile device sends its current location to the notification component 206 based on its position. For example, if the mobile device moves a predetermined distance away from the location where it last sent its location to the notification component 206, then the mobile device 216 sends an updated current location and receives an updated set of notifications. The predetermined distance can be an absolute distance (for example, 5 miles, 10 miles, 20 miles).

In some implementations, the predetermined distance can be determined based on the size of the area used by the notification component 206 to identify notifications. For example, if the size of the area is defined by a circle with a center at the current location and a radius of 10 miles, then the predefined distance may be half of the radius (5 miles) or seventy-five percent of the radius (7.5 miles).

Figure 3:
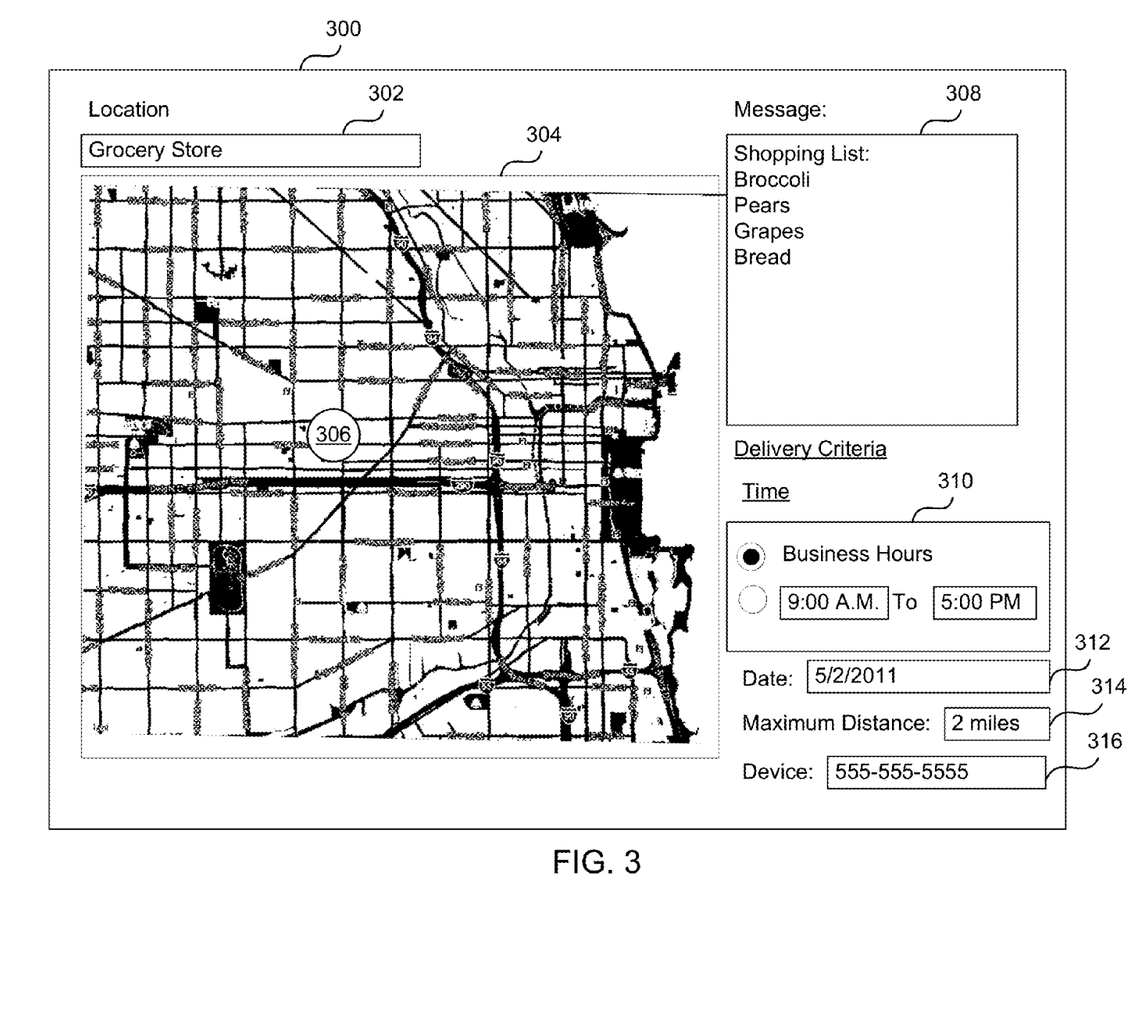
FIG. 3 illustrates an example of a user interface for submitting location-based notifications.

FIG. 3 illustrates an example of a user interface for submitting location-based notifications to the computer system 108. The user interface can be, for example, a Hypertext Markup Language (HTML) page displayed to the user in a web browser, or it can be an application executing on a mobile device. For example, the user interface can be presented on the user device 102 of FIG. 1.

In this example, the user interface 300 includes a location input area 302. The location input area allows the user to enter a location to which the notification should be delivered. A map region 304, displays a map around the location 306 identified in the location input area 302, providing a visual queue to the user to enable the user to confirm the selection of a location.

The user interface 300 includes a message input area 308, where the user can enter the message which is to be sent to the mobile device when the mobile device is in proximity to the location.

In some implementations, the user interface 300 can include delivery criteria. For example, the user interface 300 can include an input area 310 for selecting a target time for delivery. In this example, the user interface presents multiple methods for providing a target time of delivery. First, the user interface allows the user to select delivery during business hours. In some implementations, business hours may be defined universally (e.g. 9:00 A.M. to 5:00 P.M.). In other implementations, business hours may refer to the hours of operation of a business identified in the location input area 302. The user interface 300 also allows a user to enter a time range for delivery.

In some implementations, the user interface 300 inputs a date input area 312, to allow the user to select a date for notification. The user interface also includes a distance input area 314 that permits the user to define a distance from the location. In other implementations, the distance from the location is fixed.

The user interface 300 also includes a mobile device input area 316. The mobile device input area 316 allows the user to enter an identifier (e.g. a telephone number, e-mail address, etc.) which will receive the notification.

Figure 4A:
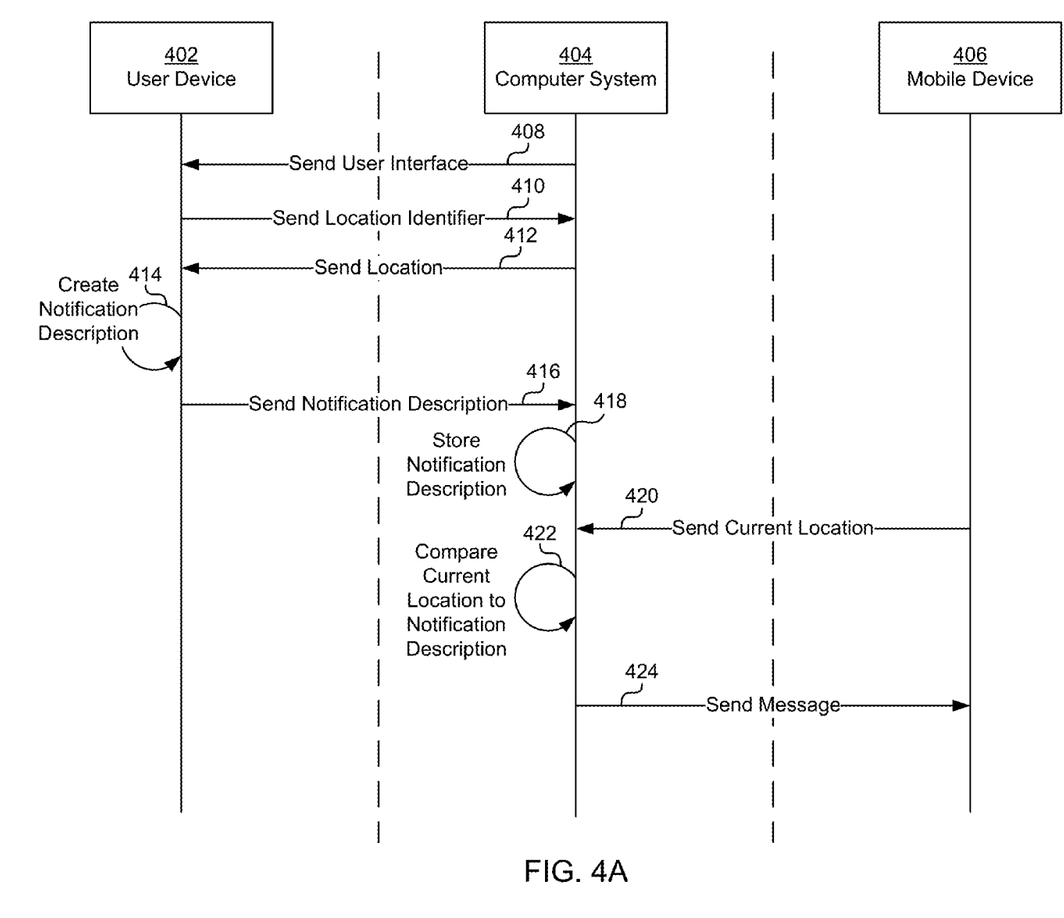
FIG. 4A is a sequence diagram illustrating an example of interactions between a user device, a computer system, and a mobile device.

FIG. 4A is a sequence diagram illustrating an example of interactions between a user device 402, a computer system 404, and a mobile device 406. The computer system 404 sends 408 a user interface to the user device 402. The user interface can be an HTML page including input fields for providing information to the computer system 404. In some implementations, the HTML page may be sent to the user device 402 from a web server.

In this example, the user device 402 sends 410 a location identifier to the computer system 404. The location identifier can be, for example, an address, the name of a retail chain, the name of a point of interest such as a school, or any other identifier which can be resolved to one or more geographic locations. The computer system 404 may send 412 location information to the user device 402. The location information may include, for example, a map of the geographic location or locations described by the location identifier. The location information may be used by a user of the user device 402 to confirm that the location identifier refers to the desired location. In some implementations, the location identifier may not be sent from the user device 402 to the computer system 404 and, consequently, location information may not be sent from the computer system 404 to the user device 402.

The user device 402 creates 414 a notification description. As discussed above, the notification description can include a location identifier, a device identifier and a message.

The user device 402 sends 416 the notification description to the computer system 404. The computer system 404 receives the notification description and stores 416 the notification description in a data store. In some implementations, the computer system 404 stores GPS coordinates. The computer system 404 can include one or more computing devices. For example, the computing device which sends 408 the user interface to the user device 402 is not necessarily the computing device which stores 418 the notification description in a data store.

At a later time, a mobile device 406 sends 420 a current location to the computer system]. The current location can be the GPS coordinates of the mobile device 406. In some implementations, the current location is sent to the computer system as part of a secure hyper text transport protocol (HTTPS) request.

The computer system 404 compares 422 the current location provided by the mobile device 406 to the stored notification descriptions. In some implementations, the computer system compares a GPS location stored in the data store to the GPS location provided by the mobile device 406. If the distance between the stored GPS location and the provided GPS location is less than a threshold value (e.g. 1 mile), then the computer system 404 determines that the stored notification description matches the current location of the mobile device 406.

If the computer system 404 determines that the stored notification description matches the current location of the mobile device 406, the computer system 404 sends 424 the message associated with the matching notification description to the mobile device 406. In some implementations, the computer system 404 identifies all notification descriptions that match all locations within a provided distance from the current location, for example, all notification descriptions for the mobile device 406 that are associated with locations within one, five, ten, or twenty miles from the mobile device. The identified notification descriptions are sent to the mobile device.

In some implementations, the size of the provided distance may depend on a measure of the speed of the mobile device. For example, if the mobile device is in a car travelling at 60 miles per hour then the predetermined distance may be larger. If the mobile device is on a person walking at 3 miles per hour, the predetermined distance may be smaller.

Figure 4B:
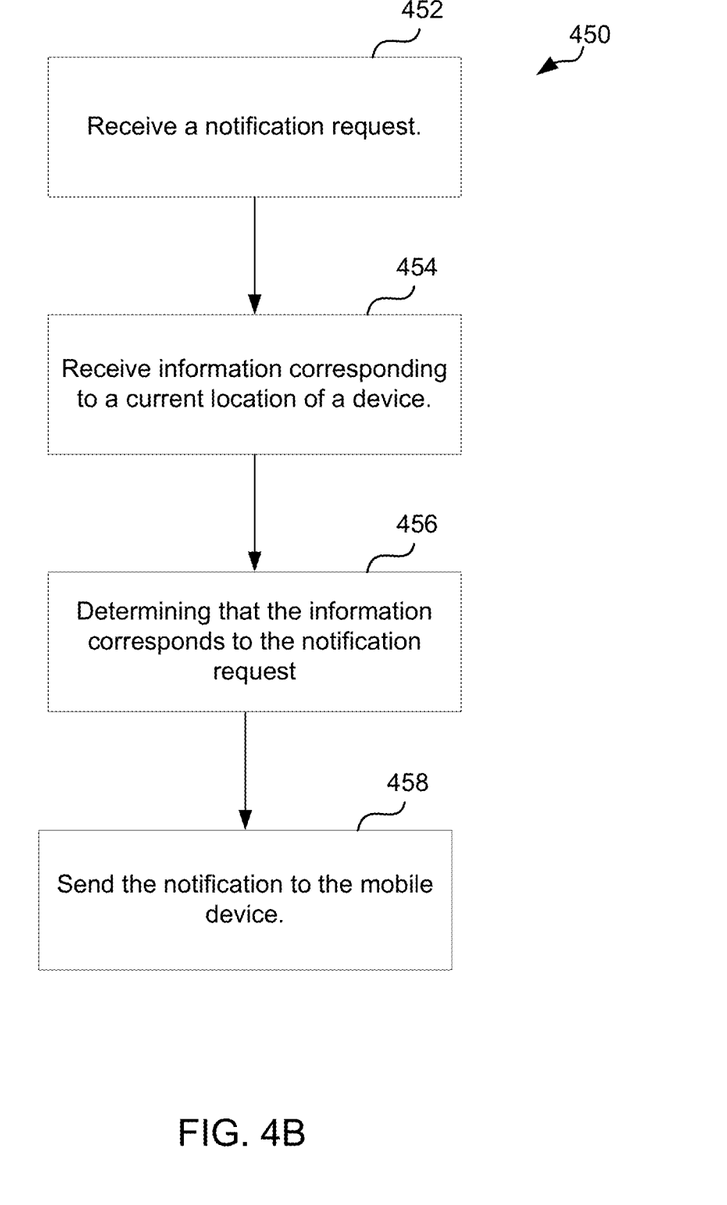
FIG. 4B is a flow chart of an example of a process for delivering location-based notifications.

FIG. 4B is a flow chart of an example of a process 450 for delivering location-based notifications. The process 450 may be performed, for example, by the notification component 206 shown in FIG. 2. For convenience, the process 450 will be described in relation to a system performing the process.

The process 450 receives a notification request. The notification request identifies when to send a notification to a device. The notification request includes a device identifier. In some implementations, the device identifier is unique to the device, such as a telephone number or serial number. The notification request also includes a message. The message may include text, sounds, images, film, or any other form of data. The notification request also includes a location identifier. The location identifier can identify a specific location, for example, using GPS coordinates. The location identifier can be associated with multiple locations, for example, a name of a chain of stores (e.g. Shop Here Now, Inc.) may by associated with the location of each store in the chain. A category of stores (e.g. grocery store, hardware store, Italian restaurant, etc.) may be associated with the location of each store that matches the category. In some implementations, the notification request can include additional information, for example a range of time during which the notification can be sent (e.g., business hours, after work, 9:00 A.M. to 11:00 A.M., Thursdays, Apr. 1, 2011, etc. . . . ). For example, the notification request may state that a message "grocery list" is to be sent to device "A" when device A is located at GPS coordinates "N42 20.292 W71 07.224".

The process 450 receives 454 information corresponding to a current location of a device. For example, the current location can be identified using GPS coordinates. The current location can also be identified using other means, for example, the current location may be identified based on the location of a cellular tower which receives transmissions from the device. The device can send the device identifier along with the location information. For example, the device "A" may send a message indicating that the current location of the device is GPS location "42 20.292 71 07.224.", The process 450 determines 456 that the information corresponds to the notification request. In some implementations, the process determines that the information corresponding to the current location corresponds to the location identifier of the device from the notification request and that the information corresponding to the identity of the device corresponds to the device identifier from the notification request. For example, the process determines that the device identifier of the device ("A") corresponds to the device identifier on the notification request ("A"), and that the current location of the device ("42 20.292 71 07.224.") corresponds to the location identifier on the notification request ("42 20.292 71 07.224.").

In some implementations, the current location corresponds to the location identifier if the current location is within a threshold distance of a location identified by the location identifier (for example, within 1 mile, 2 miles, 200 feet, etc. . . . ) For example, the process may determine that the information corresponds to the notification request when the device "A" indicates that the current location of the device is "42 20.569 71 07.225." In some implementations, the threshold distance may be described in the notification request.

The process 450 sends 458 the notification to the device. The notification includes the message on the notification request. The notification may be sent using push notifications, SMS messages, e-mail, or any other communication method. For example, the system sends an SMS message including the text "grocery list" to the device.

Figure 5:
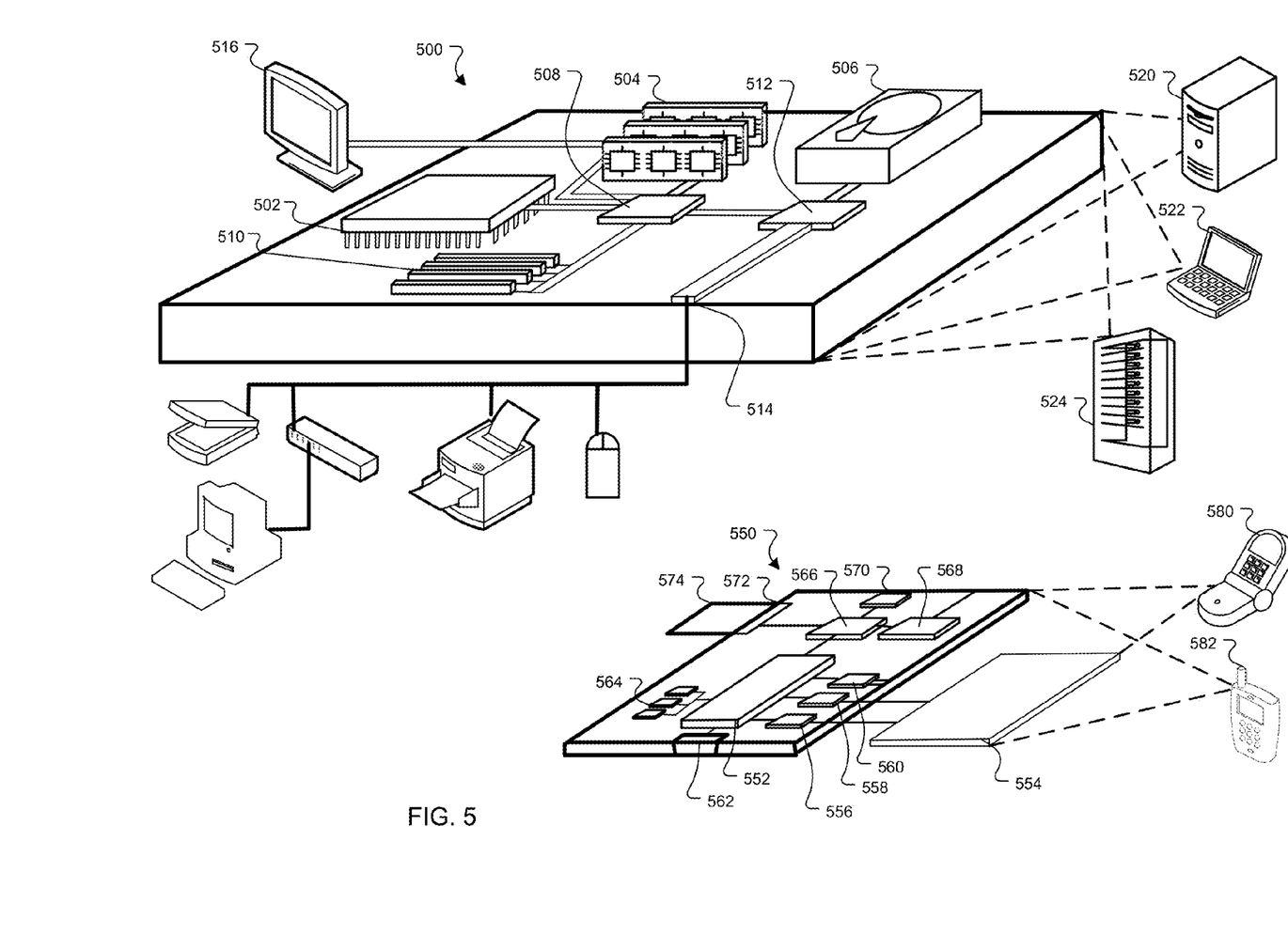
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550. Other technologies may also be used including satellite-based systems. Location-related data can also be provided by other techniques, for example geolocation based on wi-fi access points, cell tower triangulation, or other methods.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of generating predictive results and methods have been described, it should be recognized that numerous other applications are contemplated. Accordingly, other embodiments are within the scope of the following claims.

What is claimed is:

1. A computer-implemented method comprising:
receiving, by one or more computing devices a notification request, the notification request for identifying when to send a notification from the server system to a device that is a subject of the notification request, the notification request comprising elements, the elements comprising a target delivery time, device identifier, message text, and a location identifier, the target delivery time comprising suitable times for delivery of the notification, the device identifier being unique to the device, the message text comprising content for the notification, and the location identifier comprising information for use in determining data relating to a geographic location of the device;
responsive to receiving the notification request, identifying, by the one or more computing devices, one or more locations based at least in part on a category associated with the location identifier from the notification request;
receiving, by the one or more computing devices, information corresponding to a current location of the device at a current time and information corresponding to an identity of the device;
determining, by the one or more computing devices, that the information corresponding to the current location is indicative of the device being within a threshold distance of at least one of the one or more locations identified prior to receiving information corresponding to a current location of the device, that the current time is within the target delivery time, and that the information corresponding to the identity of the device corresponds to the device identifier from the notification request; and
sending, by the one or more computing devices, the notification, including the message text, to the device.

2. The method of claim 1, further comprising determining that a current time corresponds to a temporal limitation,
wherein the notification request further includes the temporal limitations.

3. The method of claim 1, wherein the location identifier identifies a retail chain and
wherein identifying locations includes identifying at least one location of a retail outlet of the retail chain.

4. The method of claim 1, wherein the device identifier is a telephone number associated with the device.

5. The method of claim 1, wherein the device identifier is a serial number of a subscriber identity module.

6. The method of claim 1 further comprising:
determining, by the one or more computing devices, a set of notifications, each notification comprising a location identifier corresponding to the current location and a device identifier corresponding to the information corresponding to the identity of the device; and
sending, by the one or more computing devices, the set of notifications to the device.

7. The method of claim 6, wherein determining a set of notifications includes determining that the location identifier for a respective notification is within a predetermined distance of the current location.

8. A non-transitory computer storage medium encoded with computer program instructions that when executed by one or more computers cause the one or more computers to perform operations comprising:
receiving a notification request, the notification request for identifying when to send a notification from the server system to a device that is a subject of the notification request, the notification request comprising elements, the elements comprising a target delivery time, device identifier, message text, and a location identifier, the target delivery time comprising suitable times for delivery of the notification, the device identifier being unique to the device, the message text comprising content for the notification, and the location identifier comprising information for use in determining data relating to a geographic location of the device;
responsive to receiving the notification request, identifying one or more locations based at least in part on a category associated with the location identifier from the notification request;
receiving information corresponding to a current location of the device at a current time and information corresponding to an identity of the device;
determining that the information is indicative of the device being within a threshold distance of at least one of the one or more locations identified prior to receiving information corresponding to a current location of the device, that the current time is within the target delivery time, and that the information corresponding to the identity of the device corresponds to the device identifier from the notification request; and
sending the notification, including the message text, to the device.

9. The medium of claim 8, further comprising determining that a current time corresponds to a temporal limitation,
wherein the notification request further includes the temporal limitations.

10. The medium of claim 8, wherein the location identifier identifies a retail chain and
wherein identifying locations includes identifying at least one location of a retail outlet of the retail chain.

11. The medium of claim 8, wherein the device identifier is a telephone number associated with the device.

12. The medium of claim 8, wherein the device identifier is a serial number of a subscriber identity module.

13. The medium of claim 8, further comprising:
determining a set of notifications, each notification comprising a location identifier corresponding to the current location and a device identifier corresponding to the information corresponding to the identity of the device; and
sending the set of notifications to the device.

14. The medium of claim 13, wherein determining a set of notifications includes determining that the location identifier for a respective notification is within a predetermined distance of the current location.

15. A system comprising:
one or more computers configured to:
receive information corresponding to a current location of a device at a current time;
access a stored notification addressed to the device and including a location identifier and a target delivery time comprising suitable times for delivery of the stored notification;
responsive to accessing the stored notification, identify one or more locations based at least in part on a category associated with the location identifier;
determine whether to send the stored notification to the device based on comparing the current location of the device to the one or more locations identified prior to comparing the current location of the device to such locations, and whether the current time is within the target delivery time; and
send a notification to the device in response to determining the device's current location is within a threshold distance of at least one of the one or more locations.

16. The system of claim 15, wherein the one or more computers are further configured to:
determine that a current time corresponds to a temporal limitation,
wherein the stored notification further includes the temporal limitations.

17. The system of claim 15, wherein the location identifier identifies a retail chain and
wherein identifying locations includes identifying at least one location of a retail outlet of the retail chain.

18. The system of claim 15, wherein the stored notification includes a telephone number associated with the device.

19. The system of claim 15, wherein the stored notification includes a serial number of a subscriber identity module.

20. The system of claim 15, wherein the one or more computers are further configured to:
determine a set of notifications, each notification comprising a location identifier corresponding to the current location and a device identifier corresponding to the information corresponding to the identity of the device; and
send the set of notifications to the device.

21. The system of claim 20 wherein determining a set of notifications includes determining that the location identifier for a respective notification is within a predetermined distance of the current location.

* * * * *